United States Patent [19]

Sirocky et al.

[11] Patent Number: 5,014,917
[45] Date of Patent: May 14, 1991

[54] HIGH-TEMPERATURE, FLEXIBLE, THERMAL BARRIER SEAL

[75] Inventors: Paul J. Sirocky, Middleburg Hts.; Bruce M. Steinetz, Broadview Hts., both of Ohio

[73] Assignee: The United States of America as represented by the Administrator of the National Aeronautics and Space Administration, Washington, D.C.

[21] Appl. No.: 441,672

[22] Filed: Nov. 27, 1989

[51] Int. Cl.$^5$ .................. B64D 33/04; F16J 15/46
[52] U.S. Cl. .................. 239/265.11; 277/34; 277/157; 277/226; 277/229
[58] Field of Search .................. 239/265.11, 265.19, 239/265.33, 265.37, 265.39; 277/34, 34.3, 34.6, 226, 228, 229, 157

[56] References Cited

U.S. PATENT DOCUMENTS

| 245,762 | 8/1881 | Armstrong . | |
|---|---|---|---|
| 779,480 | 1/1905 | Johnston . | |
| 895,037 | 8/1908 | Noble . | |
| 923,908 | 6/1909 | Stewart et al. | 277/226 X |
| 1,088,252 | 2/1914 | Anderberg | 277/226 X |
| 2,447,340 | 8/1948 | Jackson | 285/22 |
| 2,895,759 | 7/1959 | Conrad et al. | 277/229 X |
| 3,020,185 | 2/1962 | Moffitt, Jr. et al. | 277/229 X |
| 3,180,564 | 4/1965 | Fuhrmann et al. | 277/229 X |
| 4,098,076 | 7/1978 | Young et al. | 239/265.19 X |
| 4,156,533 | 5/1979 | Close et al. | 277/229 |
| 4,219,203 | 8/1980 | Bellavia et al. | 277/181 |
| 4,441,726 | 4/1984 | Uhl | 277/232 |
| 4,453,723 | 6/1984 | Greenwald | 277/229 X |
| 4,917,302 | 4/1990 | Steinetz et al. | 239/265.11 |

Primary Examiner—Andres Kashnikow
Assistant Examiner—William Grant
Attorney, Agent, or Firm—Gene E. Shook; John R. Manning; James A. Mackin

[57] ABSTRACT

This device seals the sliding interfaces between structural panels that are roughly perpendicular to each other or whose edges are butted against one another. The seal is mounted in a rectangular groove in a movable structural panel and comprises a plurality of particles or balls densely packed in an outer sheathing. The balls are laterally preloaded to maintain sealing contact with the adjacent wall using a pressurized linear bellows. Distortions in the adjacent panel are accommodated by rearrangement of the particles within the outer sheathing.

20 Claims, 3 Drawing Sheets

HIGH-TEMPERATURE, FLEXIBLE, THERMAL BARRIER SEAL

ORIGIN OF THE INVENTION

The invention described herein was made by an employee of the United States Government, together with a contractor employee performing work under a NASA contract and is subject to the provisions of Section 305 of the National Aeronautics and Space Act of 1958, Public Law 85–568 (72 Statute 435; 42 U.S.C. 2457).

TECHNICAL FIELD

This invention is concerned with an improved flexible thermal barrier seal for operation at high temperatures. The invention is particularly concerned with sealing gaps between moveable engine panels and their adjacent engine sidewalls typical of variable geometry ramjet and scramjet engines as well as two-dimensional turbojet exhaust nozzles.

Gaps caused by pressure and thermal loads on the weight-minimized, relatively compliant engine sidewalls of these hypersonic engines may be as much as 0.4 cm in only a 46 cm span which requires a very compliant "serpentine" seal to conform to the sidewall deformations. Complicating the seal's function is the requirement to articulate the engine panel and seal, wiping the seal over bowed engine sidewalls while the engine is operating.

Flowpath conditions within these engines are extreme with static gas temperatures ranging from 650° C. to 2,760° C. and pressure differentials up to 490 kPa, depending on engine configuration and axial flowpath position within each engine. It is, therefore, a primary object of the present invention to prevent these hot pressurized flowpath fluids containing hydrogen and oxygen from leaking past the moveable engine panels to back engine cavities that could cause loss of the engine or even the entire aircraft.

A further object of the invention is to provide a seal which conforms to expected engine sidewall distortions.

Another object of the invention is to provide a high temperature flexible seal which can operate at temperatures up to about 1370° C.

BACKGROUND ART

U.S. Pat. No. 245,762 to Armstrong describes a packing for a rod or valve-stem formed with solid metal rings or wires stacked in a circumferential direction around a valve stem. Various diameters are used to fill the voids between the wires. This stack of metal wires is encapsulated in a fabric. The packing structure is placed in a packing housing that surrounds a central shaft.

U.S. Pat. No. 779,480 to Johnston describes a metallic packing made of metal balls that fills an annulus between a valve stem or shaft and a gland. The balls are made of babbitt material, and the dead space between the balls is filled with graphite and oil lubricant. The balls are preloaded against the shaft using a simple spring and plug arrangement.

U.S. Pat. No. 895,037 to Noble is concerned with forming a packing for a rod. A seal is constructed with a white-metal grease impregnated core made in a ring configuration to seal a rod. The core is wrapped with layers of textile made of nickel-spring steel. The structure is finally wrapped with one or more layers of asbestos cloth. Under compression, the grease squeezes out to help seal and lubricate the piston rod.

U.S. Pat. No. 3,020,185 to Moffit Jr. et al describes a seal constructed of a compressible wire core covered by a wire-mesh fabric sheath which are then covered by polytetrafluoroethylene outer sheathing element. The seal is to be used as a static seal in the fire walls of jet engine aircraft to prevent leakage of moderate temperature gases under normal circumstances and to serve as a fire-break under emergency conditions.

U.S. Pat. No. 3,180,564 to Fuhrmann et al describes a radial seal used to seal or separate adjacent cavities of a Wankel or rotary type engine. The sealing elements are thin walled metal tubes that are formed into rectangular, bar-like sealing elements. A filler material, which is most commonly sand, is used during flattening operation to prevent flattening distortions or collapsing of the tube. Depending upon the embodiment, this filter material may or may not be left in the rectangular shaped tube. The sole purpose of the filter material when left in the seal is to prevent the thin-walled tube from collapsing due to operating loads. This filler material in no way impedes gas flow through the seal.

U.S. Pat. No. 4,219,203 to Bellavin et al is directed to a seal that is constructed of an aluminua silica batting core covered by a knitted metallic wire with a ceramic fiber sleeve braided snugly thereover. Surrounding the ceramic fiber sleeve is an outer covering of ceramic or glass fabric at least a portion of which is coated with a pressure sealing material.

U.S. Pat. No. 4,441,726 to Uhl describes a seal constructed by several approaches, depending on the operating temperature. For high temperature operation of about 1260° C. the inner core of the seal is made of dense Inconel wire mesh covered next with an intermediate cover made of a braided ceramic sleeve, which is followed by an outer wrap made of an Inconel double braided wire mesh hollow sleeve.

U.S. patent application Ser. No. 292,146 which was filed by the NASA administrator on Dec. 30, 1988, and issued as U.S. Pat. No. 4,917,302 on Apr. 17, 1990 is directed to a high temperature flexible seal. Stacked wafers having their major surfaces substantially parallel to the direction of potential leakage are preloaded in the axial direction to minimize leakage therebetween. Pressure is applied to the wafers to form a seal between a moveable panel and an adjacent sidewall.

DISCLOSURE OF THE INVENTION

A flexible high temperature thermal barrier seal constructed in accordance with the present invention comprises a high temperature outer sheathing with an inner core of densely packed, high temperature particles. The seal element is mounted in a closely mating rectangular groove of a moveable structural panel. An important feature of this invention is the seal's flexibility allowing the seal element to seal against significantly distorted adjacent sidewalls. The thermal barrier seal is preloaded lateral to its axis to maintain good sealing contact between the seal nose and the adjacent wall as well as to ensure the seal follows the distorted sidewall.

The materials chosen for the outer sheathing and the particle core offer high operating temperatures up to 1370° C. and resistance to chemical attack by either the hydrogen or oxygen engine flowpath fluids. Furthermore, the low weight density of the ceramic materials provides for a lightweight thermal barrier seal, less than half of the weight of a comparable seal made of superalloy material.

BRIEF DESCRIPTION OF THE DRAWING

The objects, advantages and novel features of the invention will be more fully apparent from the following detailed description when read in connection with the accompanying drawings wherein.

BEST MODE FOR CARRYING OUT THE INVENTION

Figure 1:
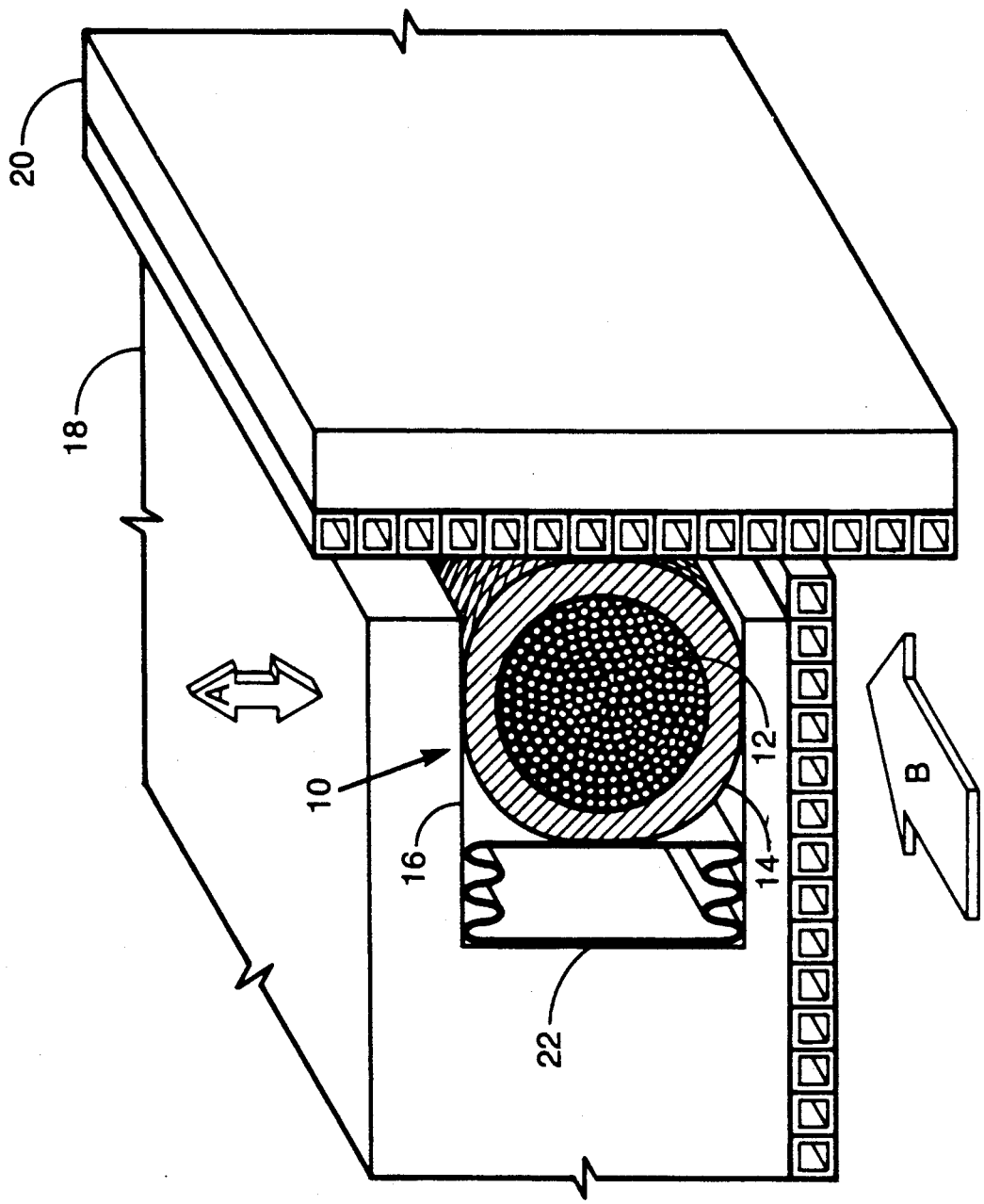
FIG. 1 is a perspective view of the high-temperature, flexible, thermal barrier seal constructed in accordance with the invention.

Referring now to the drawing there is shown in FIG. 1, a seal element 10 comprising a densely-packed particle core 12 is contained in an outer sheathing 14. The seal element is mounted in a rectangular groove 16 along the side of a movable engine panel 18. The arrows A in all three figures indicate the direction of motion of the moveable engine panels and the seals. In FIG. 1, the seal 10 and panel 18 traverse an adjacent sidewall 20 as shown by the arrow A, while the direction of engine flowpath fluids containing hydrogen and oxygen is indicated by the arrow B.

The seal 10 is laterally preloaded to maintain sealing contact with the adjacent sidewall 20. A pressurized linear bellows 22 has been satisfactory for this preloading.

The constituents of the core 12 can be any high packing density particles including: tiny diameter balls; micro cubes; platelets; powders; or any combination of these depending on the pressure drop or temperature gradient required across the seal. Also, these particles can be made of any high temperature material such as monolithic ceramics.

Materials showing best promise in meeting the extreme seal temperature demands are engineered ceramics and include SiC, $Al_2O_3$ and $Si_3N_4$ amongst others. These materials have excellent high temperature strength to about 1370° C., and they are resistant to chemical attack by hydrogen and oxygen present in the flowpath fluids.

The outer sheathing 14 can be braided of any high temperature material. A braided two-or three dimensional structure forms a satisfactory outer sheathing for the particle core 12. The braid architecture is selected to resist mechanical abrasion and to minimize leakage through the seal 10.

Sleeves braided of the high temperature engineered fibers, such as alumina-boria-silicate or silicon carbide amongst others, offer satisfactory performance as outer sheathing for seals at temperatures of advanced ramjet or scramjet engines. Tests have shown that the alumina-boria-silicate fibers maintain strength and flexibility to temperatures up to 1260° C.

It is recognized that the seal element as described herein can also be used as a thermal or flame barrier up-stream to a more positive secondary pressure seal.

DESCRIPTION OF ALTERNATE EMBODIMENTS

Figure 2:
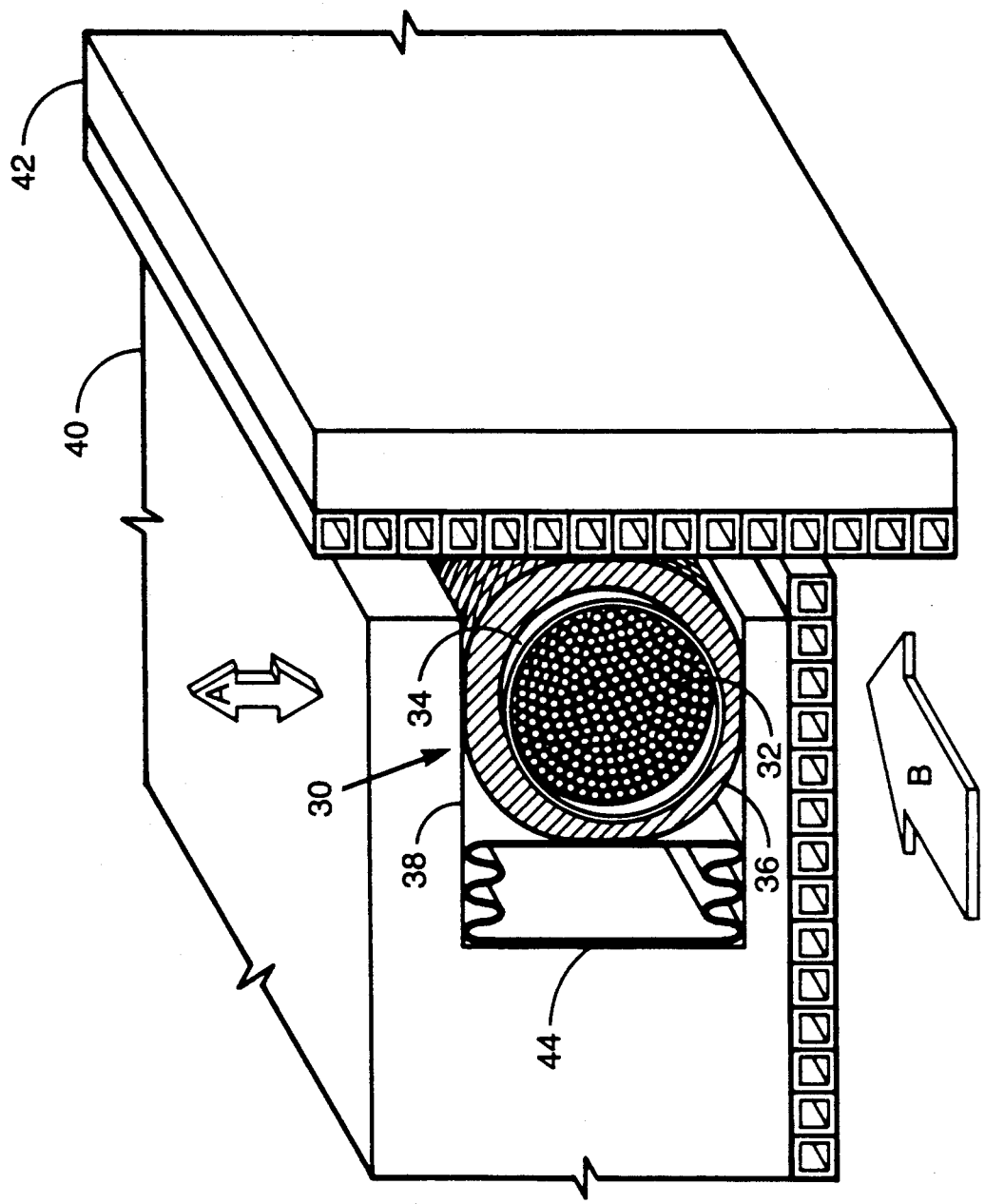
FIG. 2 is an alternate embodiment of the seal constructed in accordance with the invention with a shape-maintaining element such as a wire tube inserted between the particle core and the outer sheathing.

Referring now to FIG. 2, there is shown a seal 30 comprising a densely-packed particle core 32, a shape-maintaining element 34 contained in an outer sheathing 36. In the same manner as the embodiment shown in FIG. 1, the seal element is mounted in a channel 38 along the side of a moveable engine panel 40. The panel 40 moves in the direction shown by the arrow A while the flowpath fluids move in the direction of the arrow B.

The seal 30 is laterally preloaded to maintain sealing contact with an adjacent wall 42. A pressurized linear bellows 44 has been satisfactory for this preloading.

The shape-maintaining element 34 provides resiliency or spring-back to the seal in applications where lateral distorations are severe. An Inconel wire tube, shown in FIG. 2, forms a satisfactory shape-maintainer element for temperatures up to 1000° C. A ceramic helical spring, such as has been produced with $Si_3N_4$, forms a satisfactory shape-maintaining element for temperatures up to 1370° C.

Figure 3:
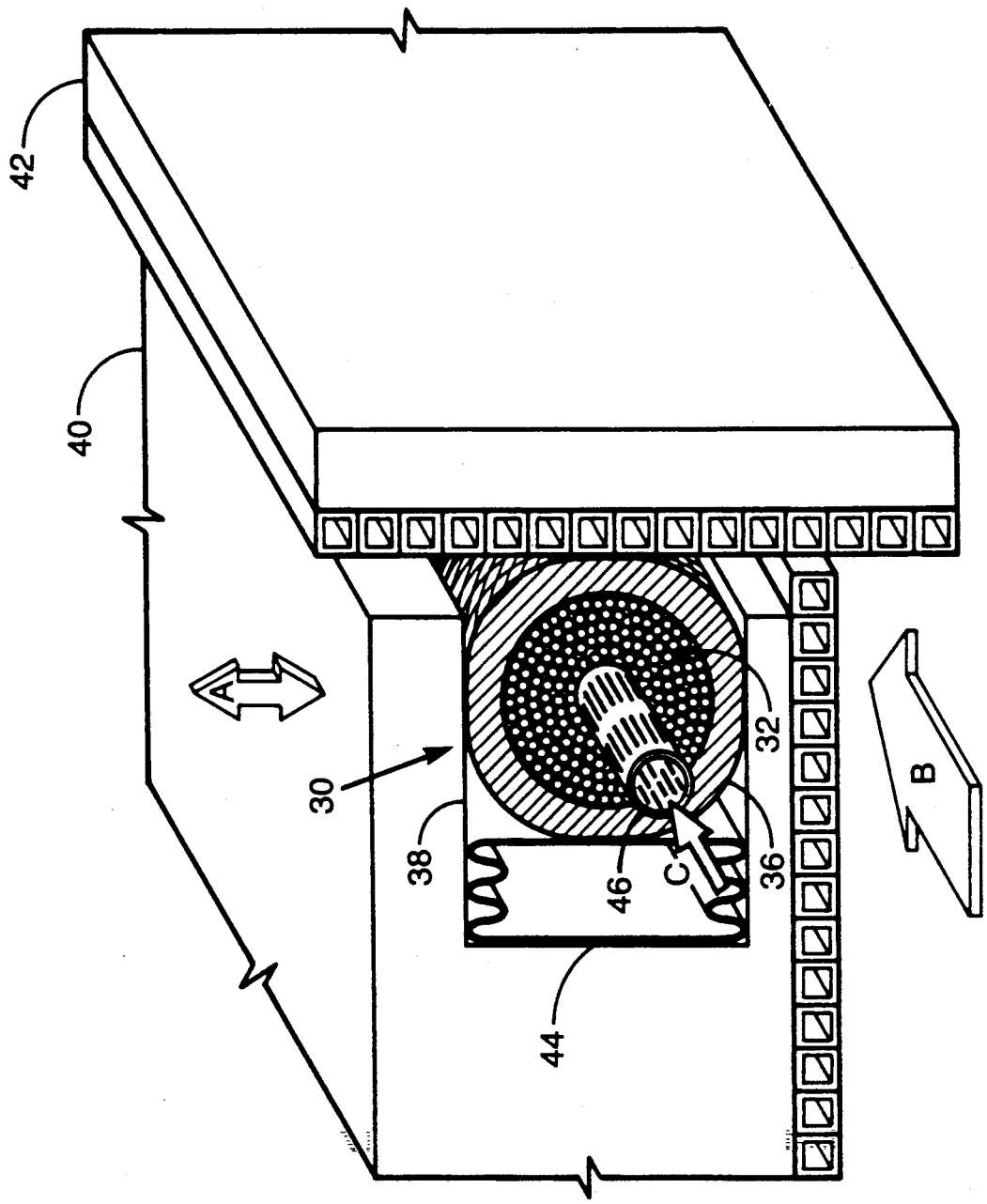
FIG. 3 is an alternate embodiment of the seal constructed in accordance with the invention with an axial coolant tube used to positively cool and purge the seal.

At axial engine stations where static gas temperatures exceed the operating temperatures of the seal materials, purge cooling as indicated by the arrow C can be introduced using a central coolant manifold 46 shown in the second alternate embodiments in FIG. 3. The use of an inert gas purge, such as helium, flowing radially out of the coolant manifold; through the seal; and positively into the flowpath chamber cools the seal and minimizes the probability of potentially explosive hydrogen-oxygen mixtures from leaking past the seal.

It is apparent that the overall size of the seal; the internal core particle shape and size distribution; particle material; outer sheathing braided architecture; outer sheathing material; internal shape-maintaining element design and material; preload technique; and cooling technique are all parameters that can be tailored for specific applictions.

The disclosed thermal barrier seal of the present invention is designed to seal gaps between structural panels. The gaps are produced by pressure and thermal loads.

Applications for the seal range from moveable panels in ramjet/scramjet engines to two-dimensional converging/diverging nozzles to re-entry vehicle access door seals. This seal may also be utilized to seal the gap between a moveable airframe panel and the body of a hypersonic vehicle airframe.

The seal may be used to seal joints in molds used to form objects from molten material, where it is necessary to prevent leakage of molten material. Along these lines the seal may be used to seal joints in high temperature furnaces. The invention may be used to accomodate and fill gaps between panels or elements of traditional structures, such as bridges, buildings, or the like that are caused by thermal distortions. It is further contemplated that the invention may be used as a gland packing between elements of cryogenic machines when gaps are caused by thermal contraction.

While several embodiments of the invention have been shown and described, it will be apparent that various modifications may be made without departing from the spirit of the invention or the scope of the subjoined claims.

We claim:

1. Apparatus for sealing a gap between a moveable structural panel and an adjacent sidewall spaced therefrom to inhibit leakage of fluids, said apparatus comprising
    an outer sheathing in said gap,
    a plurality of contiguous particles in said sheathing having surfaces in engagement with surfaces of adjacent particles, and the surfaces of the outermost particles being in engagement with the inner surface of said sheathing, and
    means for applying a lateral pressure toward said sidewall to a portion of the outer sheathing to form a seal between said sidewall and another portion of said sheathing.

2. Sealing apparatus as claimed in claim 1 wherein the moveable panel and sidewall are in a two-dimensional turbojet exhaust nozzle and the gap is produced by pressure and thermal loads.

3. Sealing apparatus as claimed in claim 1 wherein the moveable panel and adjacent sidewall are on a hypersonic engine and the gap is produced by pressure and thermal loads.

4. Sealing apparatus as claimed in claim 3 wherein said hypersonic engine is a ramjet and the moveable panel and adjacent sidewall are on said ramjet engine and the surface of the sidewall is distorted during operation of the same.

5. Apparatus as claimed in claim 3 wherein said hypersonic engine is a scramjet and the moveable panel and adjacent sidewall are on said scramjet engine and the surface of the sidewall is distorted during operation of the same.

6. Sealing apparatus as claimed in claim 3 wherein static gas temperatures within said engine are up to about 1370° C.

7. Sealing apparatus as claimed in claim 1 wherein the particles are selected from the group consisting essentially of small balls, micro-cubes, platelets, and powders.

8. Sealing apparatus as claimed in claim 7 wherein the particles are a combination of small balls, micro-cubes, platelets and powders.

9. Sealing apparatus as claimed in claim 8 wherein the particles are of a ceramic material.

10. Sealing apparatus as claimed in claim 9 wherein the particles are of a monolithic ceramic material selected from the group consisting essentially of SiC, $Al_2O_3$, and $Si_3N_4$.

11. Sealing apparatus as claimed in claim 1 wherein the center sheathing is a braided sleeve.

12. Sealing apparatus as claimed in claim 11 wherein the sheathing is a high temperature engineered material.

13. Sealing apparatus as claimed in claim 12 wherein the sheathing is a fibrous structure.

14. Sealing apparatus as claimed in claim 12 wherein the sheathing is selected from alumina-boria-silicate fibers and silicon carbide fibers.

15. Sealing apparatus as claimed in claim 11 including a pressurized linear bellows for applying a force to a portion of said sheathing containing said particles to move the same toward said sidewall.

16. Sealing apparatus as claimed in claim 1 including a shape maintaining element contained in said outer sheathing for retaining the shape of said sealing apparatus to accommodate sidewall distortions.

17. Sealing apparatus as claimed in claim 16 wherein said shape maintaining element is a wire tube.

18. Sealing apparatus as claimed in claim 16 wherein said shape maintaining element is a ceramic helical spring.

19. Sealing apparatus as claimed in claim 1 including a centrally disposed coolant manifold positioned between said particles within the outer sheath.

20. In a flexible seal for inhibiting leakage of gases through a gap between a moveable panel and an adjacent sidewall when said sidewall becomes significantly distorted in which passage of said gases is blocked by a plurality of contiguous particles, the improvement comprising
    a channel along the side of the movable panel adjacent to said gap,
    a sleeve in said channel for retaining said particles and positioning the same in contact with one another, and
    a bellows in said channel for moving said particles retained in said sleeve toward said sidewall with a predetermined preload.

* * * * *